(12) United States Patent
Prado et al.

(10) Patent No.: US 10,110,727 B2
(45) Date of Patent: Oct. 23, 2018

(54) SYSTEMS AND METHODS FOR EVENT STREAM MANAGEMENT

(71) Applicant: Google LLC, Mountain View, CA (US)

(72) Inventors: Jason Prado, San Francisco, CA (US); David Michael Renie, Mountain View, CA (US); Basel Al-Naffouri, San Francisco, CA (US); Eahab Ibrahim, Santa Clara, CA (US); John Pongsajapan, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/842,870

(22) Filed: Dec. 14, 2017

(65) Prior Publication Data

US 2018/0109670 A1    Apr. 19, 2018

Related U.S. Application Data

(63) Continuation of application No. 15/451,109, filed on Mar. 6, 2017, now Pat. No. 9,876,894, which is a continuation of application No. 14/886,035, filed on Oct. 17, 2015, now Pat. No. 9,590,945, which is a continuation of application No. 13/355,287, filed on Jan. 20, 2012, now Pat. No. 9,166,892.

(51) Int. Cl.
*G06F 15/16* (2006.01)
*H04M 1/725* (2006.01)
*H04L 12/58* (2006.01)
*H04L 12/24* (2006.01)

(52) U.S. Cl.
CPC .... *H04M 1/72552* (2013.01); *H04L 41/5093* (2013.01); *H04L 51/16* (2013.01); *H04L 51/34* (2013.01)

(58) Field of Classification Search
CPC .......... H04M 1/72552; H04L 41/5093; H04L 51/16; H04L 51/34
USPC ........................................................ 709/206
See application file for complete search history.

(56) References Cited

U.S. PATENT DOCUMENTS

| | | |
|---|---|---|
| 7,120,455 B1 | 10/2006 | Chen et al. |
| 7,548,756 B2 | 6/2009 | Velthuis |
| 8,014,770 B2 | 9/2011 | Fritsch et al. |
| 8,046,013 B1 | 10/2011 | Zhang et al. |
| 8,108,469 B2 * | 1/2012 | Kent, Jr. ............... G06Q 10/107 709/204 |

(Continued)

*Primary Examiner* — Melvin H Pollack
(74) *Attorney, Agent, or Firm* — IP Spring

(57) ABSTRACT

A system for managing event streams is provided that includes a volatile memory, a non-volatile memory, and a processor. The volatile memory is configured to store, for each of a plurality of event streams associated with the client device, metadata indicative of events not yet delivered to a client device and the content associated with only a most recent event of the event stream. The non-volatile memory is configured to store the content associated with each of undelivered events. The processor is configured to, upon receiving a request from the client device, retrieve from the volatile memory, without accessing the non-volatile memory, data indicative of a current state of an event stream associated with the client device. The processor is further configured to deliver the retrieved data indicative of the current state of the event stream.

20 Claims, 5 Drawing Sheets

(56) References Cited

U.S. PATENT DOCUMENTS

| | | | |
|---|---|---|---|
| RE43,436 E * | 5/2012 | Teven | G06Q 10/10 709/206 |
| 8,175,582 B2 * | 5/2012 | Benco | H04L 67/2823 348/157 |
| 8,200,751 B2 * | 6/2012 | Leedberg | G06F 9/546 709/203 |
| 8,250,150 B2 * | 8/2012 | Beck | G06Q 10/107 709/206 |
| 8,306,514 B1 | 11/2012 | Nunally | |
| 8,370,432 B2 * | 2/2013 | Digate | G06Q 10/107 370/401 |
| 8,402,096 B2 * | 3/2013 | Affronti | G06Q 10/107 455/466 |
| 8,660,537 B2 | 2/2014 | Lewis et al. | |
| 8,666,438 B1 | 3/2014 | Reeves et al. | |
| 8,726,293 B2 * | 5/2014 | Grayson | H04L 12/66 709/206 |
| 8,819,080 B2 | 8/2014 | Modad | |
| 8,832,228 B2 * | 9/2014 | Luna | G06F 9/5027 709/217 |
| 8,885,799 B2 * | 11/2014 | Moore | G06Q 20/085 370/352 |
| 9,043,820 B2 | 5/2015 | Klein | |
| 9,141,982 B2 | 9/2015 | van Coppenolle | |
| 9,148,397 B2 | 9/2015 | Talwar et al. | |
| 9,167,096 B2 | 10/2015 | Shaw | |
| 9,201,910 B2 | 12/2015 | Hsieh | |
| 9,203,796 B2 | 12/2015 | Hsiao et al. | |
| 9,224,259 B1 | 12/2015 | Miller | |
| 9,258,265 B2 | 2/2016 | Fabre et al. | |
| 9,294,307 B2 | 3/2016 | Bhakar | |
| 9,384,472 B2 | 7/2016 | Logtenberg | |
| 9,454,762 B2 | 9/2016 | Gaidemak | |
| 9,621,500 B2 | 4/2017 | Hsiao et al. | |
| 9,667,769 B2 * | 5/2017 | Clarke | H04M 1/72547 |
| 9,749,273 B2 | 8/2017 | Zlatokrilov | |
| 9,769,180 B2 | 9/2017 | Bedi | |
| 9,800,529 B2 * | 10/2017 | Malik | H04L 51/16 |
| 9,886,171 B2 * | 2/2018 | Lee | G06F 3/0482 |
| 9,929,994 B2 * | 3/2018 | Hamlin | H04L 51/16 |
| 9,952,759 B2 * | 4/2018 | Jobs | G06F 3/0488 |
| 9,954,996 B2 * | 4/2018 | Christie | H04M 1/72552 |
| 2003/0187938 A1 | 10/2003 | Mousseau et al. | |
| 2006/0072721 A1 | 4/2006 | Wisniewski | |
| 2008/0052365 A1 | 2/2008 | Mousseau et al. | |
| 2008/0155525 A1 | 6/2008 | Ho | |
| 2009/0176518 A1 | 7/2009 | Doni | |
| 2009/0271412 A1 | 10/2009 | Lacapra et al. | |
| 2010/0056187 A1 | 3/2010 | Abuelsaad et al. | |
| 2011/0022471 A1 | 1/2011 | Brueck | |
| 2011/0039584 A1 | 2/2011 | Merrett | |
| 2011/0047483 A1 | 2/2011 | Low et al. | |
| 2011/0173278 A1 | 7/2011 | Salonen | |
| 2011/0231498 A1 | 9/2011 | Tovar | |
| 2011/0252161 A1 | 10/2011 | Ranney | |
| 2011/0281595 A1 | 11/2011 | Salonen | |
| 2012/0078917 A1 | 3/2012 | Gradin et al. | |
| 2012/0179767 A1 * | 7/2012 | Clarke | H04L 51/34 709/206 |
| 2012/0185542 A1 * | 7/2012 | Vyrros | H04L 51/28 709/206 |
| 2012/0196632 A1 | 8/2012 | Smith et al. | |
| 2012/0210334 A1 * | 8/2012 | Sutedja | G06Q 10/107 719/314 |
| 2012/0231770 A1 | 9/2012 | Clarke et al. | |
| 2012/0278414 A1 * | 11/2012 | Walsh | G06Q 10/107 709/206 |
| 2013/0036171 A1 | 2/2013 | Gilbert | |
| 2013/0046836 A1 * | 2/2013 | Tousignant | H04L 51/16 709/206 |
| 2013/0073983 A1 | 3/2013 | Rasmussen et al. | |
| 2013/0166646 A1 | 6/2013 | Oliver et al. | |
| 2013/0179517 A1 * | 7/2013 | Grosu | H04L 51/066 709/206 |
| 2013/0191471 A1 * | 7/2013 | Evans | H04L 51/20 709/206 |
| 2013/0198652 A1 | 8/2013 | Dunn et al. | |
| 2013/0217416 A1 | 8/2013 | Matthews et al. | |
| 2014/0177813 A1 * | 6/2014 | Leeds | H04M 3/02 379/67.1 |
| 2014/0187240 A1 | 7/2014 | Chen | |
| 2014/0328189 A1 | 11/2014 | Fallon | |
| 2015/0120661 A1 | 4/2015 | Keebler | |
| 2015/0200878 A1 * | 7/2015 | Shih | H04L 51/046 709/206 |
| 2015/0236993 A1 | 8/2015 | Notani | |
| 2016/0072741 A1 | 3/2016 | Hamilton | |
| 2016/0159240 A1 | 6/2016 | Tseng | |
| 2016/0277261 A9 | 9/2016 | Ansari et al. | |
| 2017/0199881 A1 * | 7/2017 | Arriola | G06F 17/3056 |
| 2017/0255359 A1 | 9/2017 | Lemay | |

* cited by examiner

(A)

In-memory table: ⟶602

| c:1234 | |
|---|---|

(B)

In-memory table: ⟶602

| c:1234 | <undelivered:B:1000> <unread:B:1000> <undelivered:B:2000> <unread:B:2000> <event 2000 sender:A contents:hello2> |
|---|---|

On-disk table: ⟶604

| c:1234#1000 | <sender:A contents:hello1> |
|---|---|
| c:1234#2000 | <sender:A contents:hello2> |

(C)

In-memory table: ⟶602

| c:1234 | <event 2000 sender:A contents:hello2> |
|---|---|

On-disk table: ⟶604

| c:1234#1000 | sender:A contents:hello1 |
|---|---|
| c:1234#2000 | sender:A contents:hello2 |
| c:1234#3000 | <sender:B read:1000> |
| c:1234#4000 | <sender:B read:2000> |

FIG. 6

SYSTEMS AND METHODS FOR EVENT STREAM MANAGEMENT

CROSS-REFERENCE TO RELATED APPLICATIONS

This application is a continuation of U.S. application Ser. No. 15/451,109 filed Mar. 6, 2017, which is a continuation of U.S. application Ser. No. 14/886,035 filed Oct. 17, 2015, now U.S. Pat. No. 9,590,945, issued Mar. 7, 2017, which is a continuation of U.S. application Ser. No. 13/355,287 filed Jan,. 20, 2012, now U.S. Pat. No. 9,166,892, issued Oct. 20, 2015, the disclosure of which is expressly incorporated herein by reference in its entirety.

FIELD OF THE INVENTION

The invention generally relates to systems and methods for managing event streams, such as electronic communications.

BACKGROUND OF THE INVENTION

Texting, chatting, and other forms of persistent electronic communication continue to become more prevalent. With the increasing number and pace of such communications, the computer storage and processing resources needed to handle such communications have increased, as well. Moreover, participants in such conversations demand efficient updates and find processing or communication lags to be undesirable and in some circumstances unacceptable.

SUMMARY OF THE INVENTION

Disclosed herein are systems and methods for managing electronic conversations as well as systems and methods that provide updates to conversation participants with reduced perceived lag times.

Therefore, according to one aspect, the invention relates to a system for managing event streams configured to receive data indicative of events and to electronically deliver to a client device over a network content associated with such events. The system includes a volatile memory, a non-volatile memory, and a processor.

The volatile memory is configured to store, for each of a plurality of event streams associated with the client device, metadata indicative of events not yet delivered to the client device and the content associated with only a most recent event of the event stream. The non-volatile memory is configured to store the content associated with each of undelivered events.

The processor is configured to, upon receiving a request from the client device, retrieve from the volatile memory, without accessing the non-volatile memory, data indicative of a current state of an event stream associated with the client device. The current state of the event stream includes a number of undelivered events and the content associated with the most recent event in the event stream. The processor is further configured to deliver the retrieved data indicative of the current state of the event stream.

According to another aspect, the invention relates to a system for managing event streams configured to receive data indicative of events and to electronically deliver to a client device over a network content associated with such event. The system includes a volatile memory, a non-volatile memory, and a processor.

The volatile memory is configured to store, for each of a plurality of event streams, metadata indicative of events not yet delivered to the client device and the content associated with a most recent event of the event stream. The non-volatile memory is configured to store the content associated with each of the undelivered events.

The processor is configured to, upon receiving a new event associated with an existing event stream for delivery to the client device, store, in the volatile memory, in a data structure corresponding to the associated existing event stream, new metadata indicative of the new event and blindly overwrite content associated with a prior most recent undelivered event with content associated with the new event. The processor is further configured to store, in the non-volatile memory, the content associated with the new event.

According to a further aspect, the invention relates to a method of managing event streams. The method includes receiving, by a processor, data indicative of a plurality of event streams. Each event in the event streams corresponds to content to electronically deliver to a client device over a network. The method also includes storing, in a volatile memory, for each of the plurality of event streams associated with the client device, metadata indicative of events not yet delivered to the client device and the content associated with only a most recent event of the event stream. The content associated with each of undelivered events is stored in a non-volatile memory. A processor retrieves from the volatile memory, without accessing the non-volatile memory, data indicative of a current state of an event stream associated with the client device. The current state of the event stream includes a number of undelivered events and the content associated with the most recent event in the event stream. The processor then delivers the retrieved data indicative of the current state of the event stream.

According to still another aspect, the invention relates to a method for managing event streams. The method includes a processor receiving data indicative of a plurality of event streams. Each event in the event streams corresponds to content to electronically deliver to a client device over a network. For each of the plurality of event streams, the method includes storing in volatile memory metadata indicative of events not yet delivered to the client device and the content associated with a most recent event of the event stream. The content associated with each of the undelivered events is stored in non-volatile memory.

Upon receiving a new event associated with an existing event stream for delivery to the client device, the method includes storing new metadata indicative of the new event and blindly overwriting content associated with a prior most recent undelivered event with content associated with the new event in the volatile memory in a data structure corresponding to the associated existing event stream. The content associated with the new event is stored in the non-volatile memory.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which:

FIG. 6 depicts the state of data structures utilized by an electronic messaging system executing the event stream management method depicted in FIG. 4, according to an illustrative embodiment of the invention.

DESCRIPTION OF CERTAIN ILLUSTRATIVE EMBODIMENTS

To provide an overall understanding of the invention, certain illustrative embodiments will now be described, including systems and methods for managing electronic event streams, such as electronic messaging conversations. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Overview

Aspects of the invention relate to methods and systems for managing electronic event streams, such as persistent electronic messaging conversations, e.g., Short Message Service (SMS), chat room conversations, ICQ conversations, or similar conversations, such as conversations conducted via the GOOGLE+ or GOOGLE TALK software platforms made available by Google Inc., of Mountain View, Calif. The systems and methods are particularly, though not exclusively, suited for supporting such electronic conversations between and among mobile electronic devices, such as smart phones, laptops, tablet computers, or other electronic computing devices having intermittent connectivity. Specifically, the systems and methods described herein are configured to reduce latency in updating the status of conversations among such devices.

The various communications exchanged between participants in an electronic messaging conversation can be characterized as events in an event stream. Thus, while the remainder of this specification will focus on the management of an electronic messaging conversation as a particular example of an event stream, the principles also apply to the management of other electronic event streams such as moves in an asynchronous networked computer game, such as chess, SCRABBLE™, etc; or other data feeds or streams, such as those included in blogs or social media sites, including, e.g., posts submitted through GOOGLE+.

System Description

Figure 1:
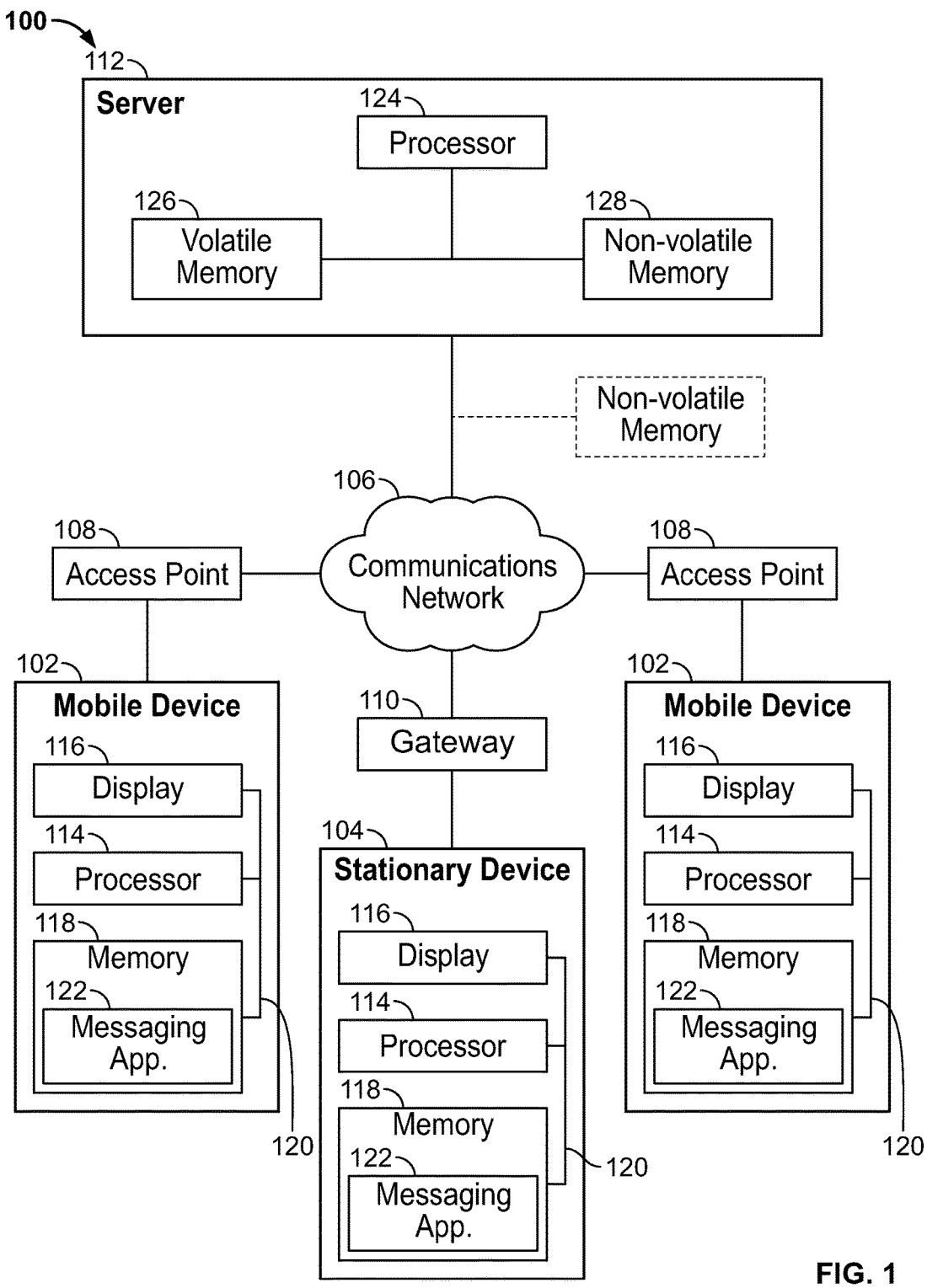
FIG. 1 is a block diagram of a system for electronic messaging, according to an illustrative embodiment of the invention.

FIG. 1 is a block diagram of a system 100 for electronic messaging, according to an illustrative embodiment of the invention. The system 100 includes a combination of computing devices, including mobile devices 102 and stationary computing devices 104. The mobile devices 102 connect to a communications network 106 via wireless access points 108 (e.g., cell towers, 802.11 based routers, or other wireless access points), whereas the stationary computing devices 104 connect to the communications network via a network gateway 110, for example at an Internet Service Provider (ISP). The communications network 106 can include portions of the Internet, as well as portions of private wide area networks. The system 100 also includes a messaging server 112 for managing electronic conversations between and among the mobile devices 102 and/or the stationary devices 104. Each electronic conversation may include two or more conversation participants utilizing corresponding computing devices.

The mobile devices 102 may take the form of smart phones, personal digital assistants, tablet computers, laptops, or other mobile computing device capable of networked communications, preferably over a wireless link. Illustrative stationary devices 104 include desktop computers, laptop computers that are connected to a network via a wired connection, e.g., by an Ethernet cable. Regardless of whether a device is mobile or stationary, the device includes a processor 114, a display 116, memory 128, and a data bus 120 communicatively coupling them together. The processor 114 may be general purpose processors, such as ARM processors (such as the CORTEX-A5 ARM processor) provided by ARM Ltd. of Cambridge, England, OMAP processors provided by Texas Instruments Inc. of Dallas, Tex., or other general purpose processors, provided, e.g., by Intel Corporation of Santa Clara, Calif., or Advanced Micro Designs, Inc. of Sunnyvale, Calif. The memory can include both volatile memory, such as system RAM and cache memory as well as non-volatile memory, such as a magnetic, optical, or integrated circuit memory. In operation, in addition to other functionality executed by the processor 114, the processor 114 loads computer readable instructions corresponding to a messaging application 122 into volatile memory from the non-volatile memory for execution. The messaging application 122 enables a messaging participant to form, transmit, receive, and display electronic messages, including, without limitation, text, graphics (such as photographs or other images), audio and/or other multimedia content.

Additional computer readable instructions stored in the memory, when executed by the processor 114 cause the device to connect to the communications network 106 and communicate with the messaging server 112 to learn the current status of electronic conversations in which the user of the device incorporating the processor 114 is participating. These instructions may be executed intermittently, periodically, upon reconnection to the communications network 106 or in response to a user input. In addition, or in the alternative, the processor 114 may execute computer executable instructions which cause the processor 114 to process status updates proactively pushed out to the device. Particularly with respect to devices with intermittent access to a network or for devices which seek status updates infrequently to preserve battery life, the status of the various conversations in which the user of such device is participating may change substantially between updates. Users of such devices, however, expect the mobile device to be able to download and process such updates in a very short amount of time, preferably with little or no noticeable lag time. The messaging server 112, as described further below, is therefore configured to efficiently store, retrieve, and communicate updates to electronic conversations to devices such as devices 102 or 104.

The messaging server 112 includes a processor 124, volatile memory 126, and non-volatile memory 128. The messaging server processor 124 includes one or more server processors, such as XEON processors, produced by Intel Corporation, or OPTERON processors produced by Advanced Micro Devices, Inc., or other general purpose processors designed for use in a computer server.

The volatile memory 126 can be any form of volatile memory described above with respect to the mobile and stationary devices 102 and 104. In addition to storing computer executable instructions for causing the server processor 124 to carry out the functionality described herein, the volatile memory 126 also stores current status information about the electronic conversations managed by the messaging server 112, as is described further below. Alternatively, the status information may be stored in separate volatile memory managed by the messaging server 112.

The non-volatile memory 128 can similarly include any of the forms of memory described above for long-term storage of computer executable instructions for loading into volatile memory to be executed by the server processor 124. In one embodiment, the messaging server 112 also includes one or more higher-capacity magnetic hard disks as additional non-volatile memory devices for storing the contents of the electronic conversations it manages. In alternative embodiments, a separate non-volatile memory device, such as a separate hard drive, or collection of hard-drives is coupled to the messaging server 112 over a network connection, e.g., over a local area network. In such embodiments, the server processor 124 and non-volatile memory 128 are preferably generally co-located to reduce latencies that may be introduced by longer-distance electronic communications. In still another embodiment, the messaging server includes a high capacity volatile memory, e.g., a high-capacity flash memory instead of, and providing similar functionality to the non-volatile memory 128.

In one embodiment, the messaging server 112 and/or messaging application 122 notifies users of the types of information that are stored in the respective application logs and that are transmitted to the server, and provides the user the opportunity to opt-out of having such information collected and/or shared with the messaging server 112.

Client Applications

Figure 2:
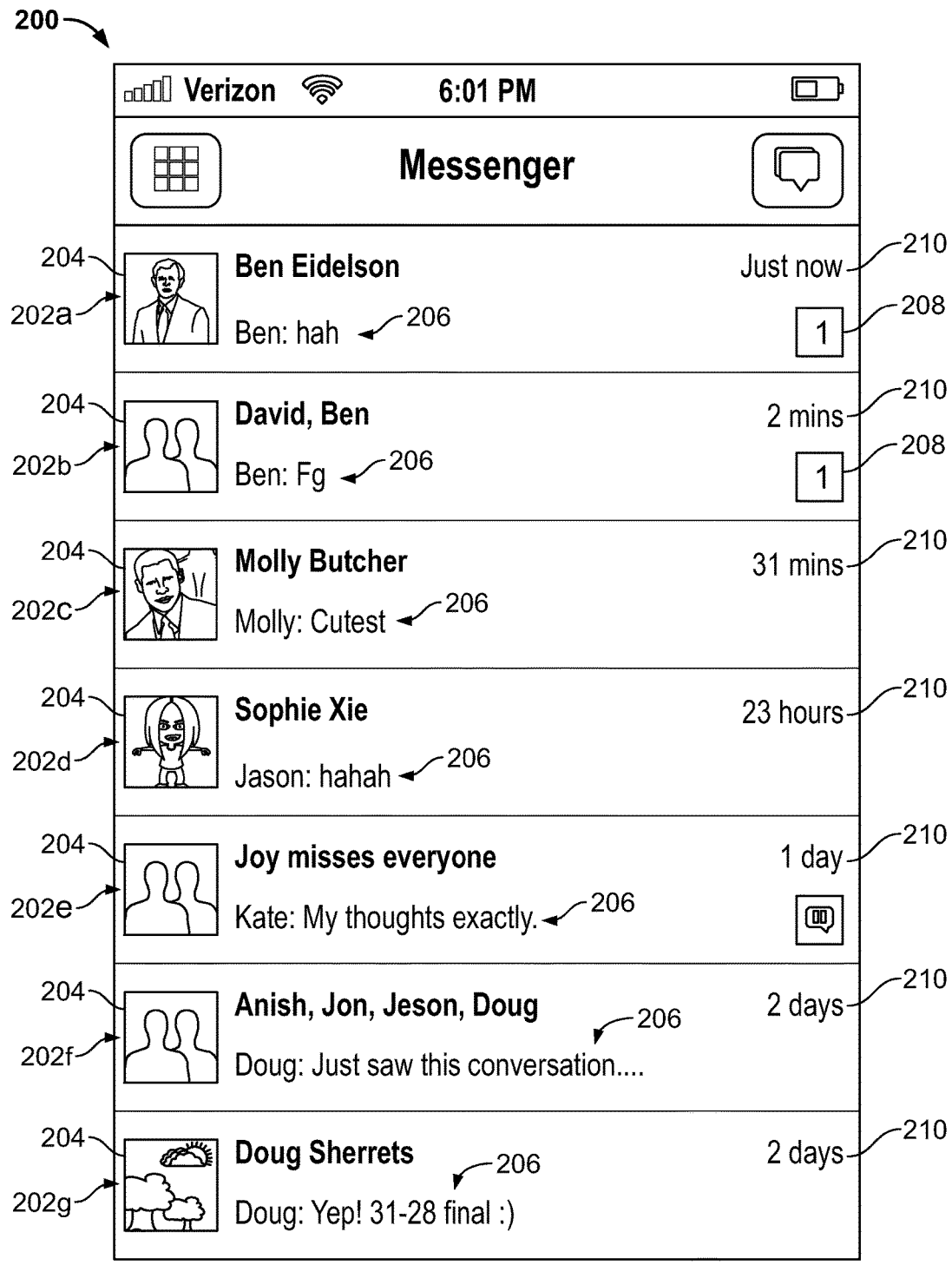
FIG. 2 is a screen shot of an electronic device display executing an electronic messaging application suitable for use with the system of FIG. 1, depicting the status of a plurality of electronic conversations, according to an illustrative embodiment of the invention.

FIG. 2 depicts a screen shot of a conversation status page 200 presented on the display 116 of an electronic device, such as the mobile device 102, executing an electronic messaging application 122 suitable for use with the system of FIG. 1, according to an illustrative embodiment of the invention. The conversation status page 200 includes the status of a plurality of electronic conversations 202a-202g (each generally an electronic conversation 202) in which the user of the device is participating. The messaging application 122 depicts each conversation 202 in a separate row on the conversation status page 200. For each conversation 202, the conversation status page includes an image 204 (e.g., a photograph or avatar) corresponding to a counterparty in the conversation 202, along with the most recent communication 206 in the conversation 202, an indication of the number of unread messages 208 (if any) existing in the conversation, and an indication of the amount of time 210 that has past since the last event in the conversation occurred 202. For an electronic conversation involving more than two participants, in one embodiment, the image 204 presented with the conversation 202 is an image associated with the participant, other than the user of the device, that most recently contributed to the conversation 202. Via the conversation status page 200, a user can select a conversation 202 to view the full contents of that conversation 202. Depending on the type of device executing the messaging application 122, the conversation can be selected via a touch screen interface, a mouse click, a voice command, or other user interface input. In certain embodiments, the conversation status page 200 also includes user interface elements, which if selected by a user, enable the user to start new conversations and/or delete existing conversations.

Figure 3:
FIG. 3 is a second screen shot of the electronic device display executing the electronic messaging application, suitable for use with the system of claim 1, depicting the content associated with one of the electronic conversations, according to an illustrative embodiment of the invention.

FIG. 3 depicts a second screen shot, corresponding to a conversation contents page 300, presented on the display 116 of an electronic device, such as mobile device 102, executing the electronic messaging application 122 described above, according to an illustrative embodiment of the invention. The conversation contents page 300 depicts the full contents (to the extent it fits on the display 116) associated with one of the electronic conversations 202, including all previously unread communications in the conversation 202. As described above, a communication can include text, video, image, audio and/or other media content. For dynamic content, such as video or audio content, the messaging application 122 displays an icon associated with the audio or screenshot associated with the video, which when selected causes the messaging application 122 to play the video or audio content. The messaging application 122 can play the video or audio content via an integrated media player, or by causing an independent media player to be loaded into memory and executed to present the content.

The conversation contents page 300 may also display additional communications, stored locally on the device, which had previously been read by the user of the device, including communications generated by the user. In certain embodiments, the conversation contents page 300 also includes user interface elements via which a user can generate a new communication, initiate a new conversation 202, or delete individual, multiple, and/or all communications in the presently viewed conversation 202. As indicated above, each communication in the conversation 202 can be considered an event in an electronic event stream.

Processing Methodology

Figure 4:
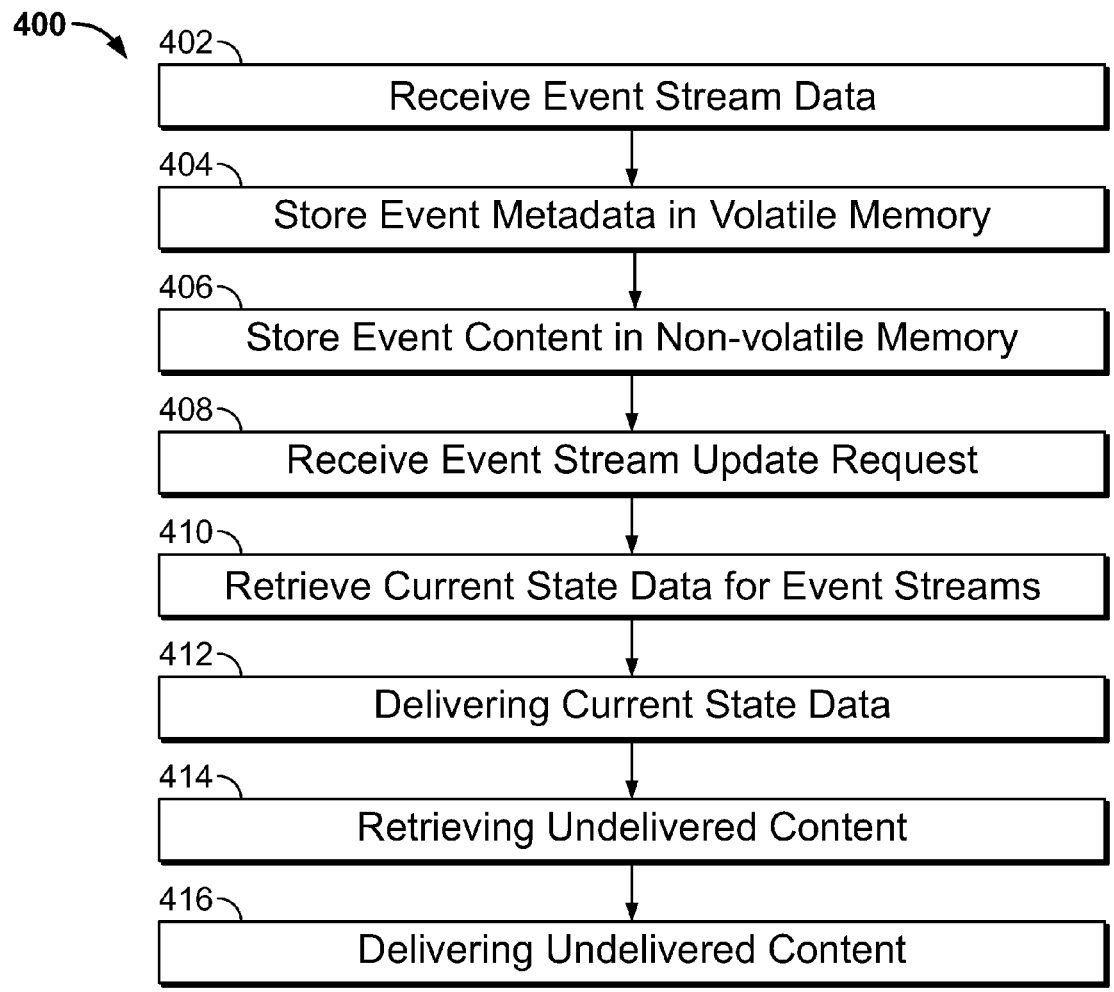
FIG. 4 is a flow chart of a method of managing event streams, such as the electronic conversations handled by the electronic messaging application, as executed by the electronic messaging system of FIG. 1, according to an illustrative embodiment of the invention.

FIG. 4 is a flow chart of a method 400 of managing event streams, such as the electronic conversations 202 handled by the electronic messaging application 122 described above, as executed by the electronic messaging system 100 of FIG. 1, according to an illustrative embodiment of the invention. The method includes receiving event stream data (step 402), storing event metadata in volatile memory (step 404), and storing event content in non-volatile memory (step 406). In addition, the method includes receiving an event stream update request (step 408) and in response, retrieving current status data for event streams associated with a user (step 410), delivering the current status data (step 412), retrieving undelivered content (step 414), and delivering the retrieved undelivered content to the user (step 416). As indicated above, each communication in a conversation can be considered an event in an electronic event stream. Thus, each of the steps in the method 400 referred to above will be described in the context of an event stream in which the stream is an electronic conversation and each communication in that conversation constitutes an event in the event stream.

Referring to FIGS. 1-4, the method 400 begins with receiving event stream data (step 402). In particular, the messaging server 112 receives a new communication over the communications network 106 from one of the mobile or stationary devices 102 or 104. In order to be able to rapidly retrieve and transmit the current status of the conversation 202 with which the communication is associated, for example to allow a mobile or stationary device 102 or 104 to rapidly generate the conversation status page 200 of FIG. 2, the messaging server 112 stores metadata associated with the new event in volatile memory 126 (step 404). In particular, as will be described further in relation to FIG. 6, for a given conversation 202, the messaging server stores a conversation identifier, a list of all undelivered and unread communications in the conversation 202 for each participant in the conversation 202, along with the content of the most recent communication in the conversation 202.

At substantially the same time that the messaging server 112 updates the conversation metadata stored in volatile memory 126 (step 404), the messaging server 112 also stores the content of the new communication in the non-volatile memory 128 (step 406). The messaging server 112 stores the content of new communications in the non-volatile memory 128 in chronological order, sorted by the time of arrival of the communication at the messaging server 112. The content is stored using a log-based write. Storing data in this fashion allows the messaging server 122 to retrieve all undelivered messages in a conversation 202 from the non-volatile memory 128 with a single disk read, without having to seek multiple positions on the disk. In one embodiment, the messaging server 112 stores the content of the new communication in positions both before and after the content of the previously stored communications. In this storage configuration, the non-volatile memory 128 can retrieve all undelivered communications in both forward and reverse chronological order to suit various user preferences with a single forward disk read. In either case, the conversation identifier and a time stamp indicating the receipt of the communication are stored along with the content in the non-volatile memory 128. In one embodiment, the time stamp used has microsecond precision.

Subsequently, the messaging server 112 receives an event stream update request (step 408) from a device participating in the communication. As indicated above, the request may be triggered periodically, intermittently, upon reconnecting of the device to the communications network 106, or upon user command. The request may include a tuple consisting of a start time and end time requesting all undelivered communications received during the time range defined by the tuple. In one embodiment, messaging applications 122 are configured to supply the time of the immediately preceding update as the start time and infinity as the end time as default values in the tuple, thereby obtaining delivery of all undelivered communications. In certain embodiments, the messaging application 122 on the device allows a user to adjust the start time value, for example, to enable the user to only request messages received by the messaging server during a prior predetermined period of time, for example, the last hour, day, or week. In certain other embodiments the messaging application 122 on the device allows the user to adjust both the start and end times to obtain messages received by the messaging server 112 during a user-defined time period.

In response to receiving the request, the messaging server 112 queries its volatile memory 126 to retrieve the current status of all conversations 202 in which the user of the device is participating (step 410). Specifically, the messaging server 112 retrieves for each conversation 202 the number of unread communications and the content of the most recent communication in the conversation 202. This current status information is then delivered to the requesting device (step 412).

While the user of the device views the current status information in the current status page 200 of the messaging application 122, the messaging server 112 retrieves the content of all undelivered messages associated with the user from the non-volatile memory 128 (step 414), preferably using a single forward read operation for each conversation. The messaging server then delivers the retrieved content (step 416). The content retrieval (step 414) and delivery (step 416) operations can often be completed in an amount of time that is less than the time a typical user takes to select a given conversation 202 from the conversation status page 200 of the messaging application 122. If there are no undelivered communications, the messaging server can forego accessing the non-volatile memory 128 completely. By dividing the messaging update process into the two-step process described above, i.e., providing a status update while content is separately delivered in the background, users can view updates to the status of conversations they participate in with limited to no noticeable lag, while also eliminating unnecessary disk reads.

In one embodiment, devices receiving conversation updates transmit acknowledgement messages confirming receipt of transmitted messages. Upon receipt of a delivery acknowledgement, the messaging server 112 updates the data stored in the volatile memory 126 deleting entries in the data table stored thereon identifying undelivered communications for any communication for which delivery was confirmed. As a user of a device selects a specific conversation 202 to view, transitioning from the conversation status page 200 to the conversation content page 300, the device sends an additional acknowledgement message allowing the messaging server to delete references to unread communications associated with that conversation. The messaging server 112 may also store records of the delivery and/or read acknowledgement messages into the non-volatile memory 128 indexed by the time the acknowledgement message was received.

Figure 5:
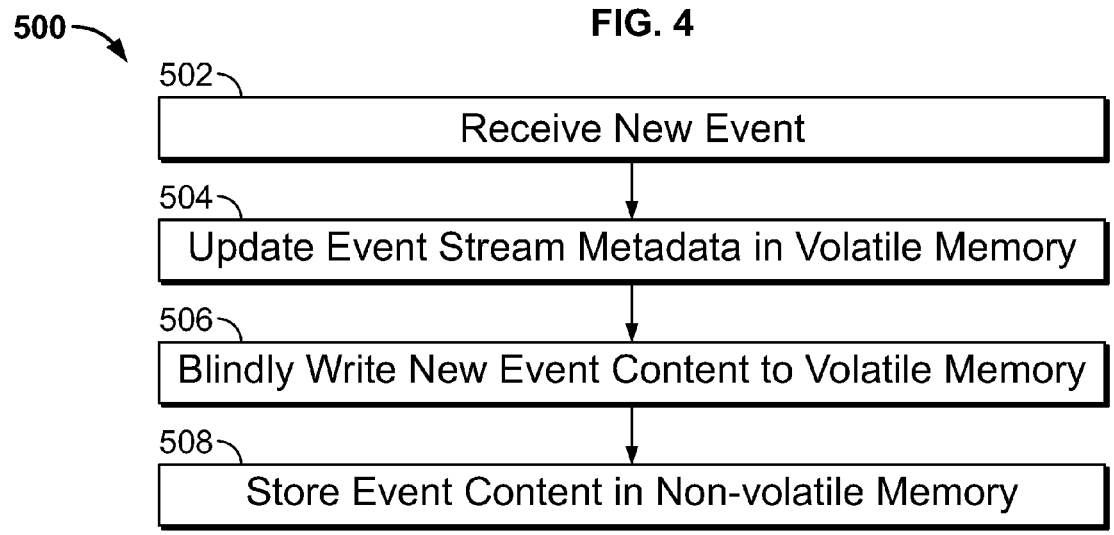
FIG. 5 is a flow chart of a method for storing information associated with new events in an event stream, suitable for use with the electronic messaging system of FIG. 1, according to an illustrative embodiment of the invention.

FIG. 5 is a flow chart of one particular method 500 for storing information associated with new events in an event stream, suitable for use with the electronic messaging system 100 of FIG. 1 and the method 400 of FIG. 4. The method 500 includes receiving a new event (step 502), storing certain metadata associated with the new event in volatile memory 126 (step 504-506), and storing the content associated with the new communication in non-volatile memory 128 (step 508). Of particular note in this method, when the content of the new communication is stored in volatile memory 126, it is stored with a blind write operation, overwriting whatever data was stored previously as the most recent communication. This process is in contrast to the alternative process of storing the data in volatile memory 126 with a more typical read-write operation, which includes reading the previously stored data prior to writing the new data. By avoiding the read operation, the messaging server 112 can expedite the data storage process.

FIG. 6 depicts the state of data structures utilized by the electronic messaging system 100 executing the event stream management method 400 depicted in FIG. 4, according to an illustrative embodiment of the invention. FIG. 6 includes three panels, labeled A), B), and C), depicting the state of data tables stored in volatile memory 126 and non-volatile memory 128 of the messaging server 112 at three stages of the event stream management method 400 for a particular conversation 202 (specifically conversation 1234). Panel A)

depicts the state of the in-memory table 602 (i.e., the data structure used by the messaging server 112 to store data in volatile memory 126) prior to a first communication in conversation 1234. Panel B) depicts the state of the in-memory table 602 and the on-disk table 604 (i.e., the data structure used by the messaging server 112 to store data in non-volatile memory 128) after two communications associated with conversation 1234 have been received by the messaging server 112 intended for one participant in the conversation, participant B, but prior to delivery of the communications to the participant B. Finally, panel C) depicts the status of both data structures 602 and 604 after delivery of both communications to participant B.

Referring to Panel A), the on-disk table 602 maintains a single row for each conversation. Each conversation is assigned a unique conversation identifier 606. The identifier may be assigned either randomly or deterministically. In panel A) no communication information is stored in relation to the conversation identifier 606, indicating there are no undelivered or unread communications associated with the conversation. This condition would exist prior to any communication being exchanged between participants in the conversation.

Panel B) includes both the in-memory table 602 and the on-disk table 604 after two communications have been received by the messaging server 112, but before the communications have been delivered. In the in-memory table 602, each undelivered communication and each unread communication is labeled with an intended recipient identifier and a communication number. In one embodiment, the communication number is the microsecond-precision timestamp used to identify the communication in the non-volatile memory 128. In other embodiments, the communication number is the value of a counter that increments by a predetermined amount with each message received.

The in-memory table 602 includes four entries for undelivered and unread communications. Specifically, communications having communication numbers 1000 and 2000 are listed as being both undelivered to, and unread by, participant B. In addition, the in-memory table stores the content of the most recent communication, labeled with the communication number and the sender. The content may include text or a pointer (e.g., a file name, memory location, link, or URL) to, or raw data for, multimedia content. For example, the in-memory table 602 in Panel B indicates that the most recent communication is communication number 2000 from participant A. The contents of communication 2000 are "hello2."

The on-disk table 604 in panel B) includes two entries, one corresponding to each communication in conversation 1234. Each is labeled by a microsecond precision timestamp (not shown) as well as the conversation number and communication number. For each entry, the disk table stores the sender of the communication along with its corresponding content. For example, in the on-disk table 604, conversation 1234 includes communications 1000 and 2000, each sent by participant A. The contents of communication 1000 are "hello1." The contents of communication 2000 are "hello2." In embodiments in which the in-memory table uses the microsecond-precision timestamp as an identification number, the on-disk table may omit storing a separate communication number.

Panel C) reflects the state of the in-memory table 602 and on-disk table 604 after communications 1000 and 2000 have been successfully delivered to, and read by, participant B. In-memory table 602 no longer includes references to any undelivered or unread communications. Reference to such communications were deleted by the messaging server 112 upon receipt of messages from participant B that the communications were both received and read by participant B. Only information about the most recent communication in the conversation remains in the in-memory table 602.

The on-disk table 604 includes the now delivered and read communications, as well as entries acknowledging that participant B read each of the messages. The system stores this information so that the next time participant A, the sender of messages 1000 and 2000 updates the status of the conversation, the messaging server 112 will be able to inform participant A that its prior communications were in fact read. In other embodiments, the messaging server forgoes storing read acknowledgements in the on-disk table 604.

While various embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method comprising:
   receiving, by a processor, data of an event stream, each event in the event stream to be delivered electronically to a client device over a network;
   storing a data structure indicative of one or more events in the event stream that are not yet delivered to the client device, wherein the event stream is assigned a unique conversation identifier, and wherein the data structure includes:
      one or more entries corresponding to the one or more events in the event stream, wherein each of the one or more entries includes a communication number, a recipient identifier associated with a recipient, and a status; and
      content of a most recent event of the one or more events in the event stream labeled with the communication number for the most recent event and a sender identifier associated with the most recent event;
   retrieving, by the processor, from the data structure, data indicative of a current state of the event stream, wherein the current state of the event stream includes a number of events not yet delivered to the client device and the content of the most recent event in the event stream; and
   sending, by the processor, the retrieved data indicative of the current state of the event stream to the client device.

2. The method of claim 1, further comprising receiving an event stream update request from the client device, wherein the retrieving is performed in response to receiving the event stream update request.

3. The method of claim 1, further comprising, after the sending, deleting the one or more entries corresponding to the one or more events in the event stream from the data structure.

4. The method of claim 1, wherein the client device is associated with the recipient.

5. The method of claim 1, wherein the communication number in each of the one or more entries is a timestamp used to identify the event.

6. The method of claim 1, wherein the status in each of the one or more entries is one of an undelivered event status or an unread event status.

7. The method of claim 1, wherein storing the data structure comprises storing an in-memory table in a volatile memory.

8. The method of claim 1, further comprising storing a second data structure in an on-disk table, wherein the second data structure includes one or more entries that each include content of a respective individual event of the one or more events and a sender identifier associated with the individual event, wherein each of the one or more entries is labeled by the unique conversation identifier and a communication number for the respective individual event.

9. The method of claim 1, further comprising:
receiving, by the processor, additional data of the event stream, wherein the additional data includes an additional event in the event stream to be delivered electronically to the client device over the network; and
in response to receiving the additional data, overwriting the content of the most recent event in the data structure with content of the additional event labeled with a communication number of the additional event and a sender identifier associated with the additional event.

10. The method of claim 9, wherein the additional event is associated with a timestamp that corresponds to a time that is later than a time corresponding to a timestamp of the most recent event.

11. A system comprising:
one or more processors; and
a non-transitory computer-readable medium including instructions that when operated upon by the one or more processors cause the one or more processors to perform operations comprising:
receiving data of an event stream, each event in the event stream to be delivered electronically to a client device over a network;
storing a data structure indicative of one or more events in the event stream that are not yet delivered to the client device, wherein the event stream is assigned a unique conversation identifier, and wherein the data structure includes:
one or more entries corresponding to the one or more events in the event stream, wherein each of the one or more entries includes a communication number, a recipient identifier associated with a recipient, and a status; and
content of a most recent event of the one or more events in the event stream labeled with the communication number for the most recent event and a sender identifier associated with the most recent event;
retrieving from the data structure, data indicative of a current state of the event stream, wherein the current state of the event stream includes a number of events not yet delivered to the client device and the content of the most recent event in the event stream; and
sending the retrieved data indicative of the current state of the event stream to the client device.

12. The system of claim 8, the operations further comprising receiving an event stream update request from the client device, wherein the retrieving is performed in response to receiving the event stream update request.

13. The system of claim 8, the operations further comprising, after the sending, deleting the one or more entries corresponding to the one or more events in the event stream from the data structure.

14. The system of claim 8, wherein the communication number in each of the one or more entries is a timestamp used to identify the event.

15. The system of claim 8, the operations further comprising storing a second data structure in an on-disk table, wherein the second data structure includes one or more entries that each include content of a respective individual event of the one or more events and a sender identifier associated with the individual event, wherein each of the one or more entries is labeled by the unique conversation identifier and a communication number for the respective individual event.

16. A non-transitory computer-readable medium storing a computer program that is executable by at least one processor, the computer program including instructions that cause the at least one processor to perform operations comprising:
receiving data of an event stream, each event in the event stream to be delivered electronically to a client device over a network;
storing a data structure indicative of one or more events in the event stream that are not yet delivered to the client device, wherein the event stream is assigned a unique conversation identifier, and wherein the data structure includes:
one or more entries corresponding to the one or more events in the event stream, wherein each of the one or more entries includes a communication number, a recipient identifier associated with a recipient, and a status; and
content of a most recent event of the one or more events in the event stream labeled with the communication number for the most recent event and a sender identifier associated with the most recent event;
retrieving from the data structure, data indicative of a current state of the event stream, wherein the current state of the event stream includes a number of events not yet delivered to the client device and the content of the most recent event in the event stream; and
sending the retrieved data indicative of the current state of the event stream to the client device.

17. The non-transitory computer-readable medium of claim 16, wherein the operations further comprise receiving an event stream update request from the client device, wherein the retrieving is performed in response to receiving the event stream update request.

18. The non-transitory computer-readable medium of claim 16, wherein the operations further comprise, after the sending, deleting the one or more entries corresponding to the one or more events in the event stream from the data structure.

19. The non-transitory computer-readable medium of claim 16, wherein the operations further comprise:
receiving additional data of the event stream, wherein the additional data includes an additional event in the event stream to be delivered electronically to the client device over the network; and
in response to receiving the additional data, overwriting the content of the most recent event in the data structure with content of the additional event labeled with a communication number of the additional event and a sender identifier associated with the additional event.

20. The non-transitory computer-readable medium of claim 19, wherein the additional event is associated with a timestamp that corresponds to a time that is later than a time corresponding to a timestamp of the most recent event.

* * * * *